Aug. 12, 1924.

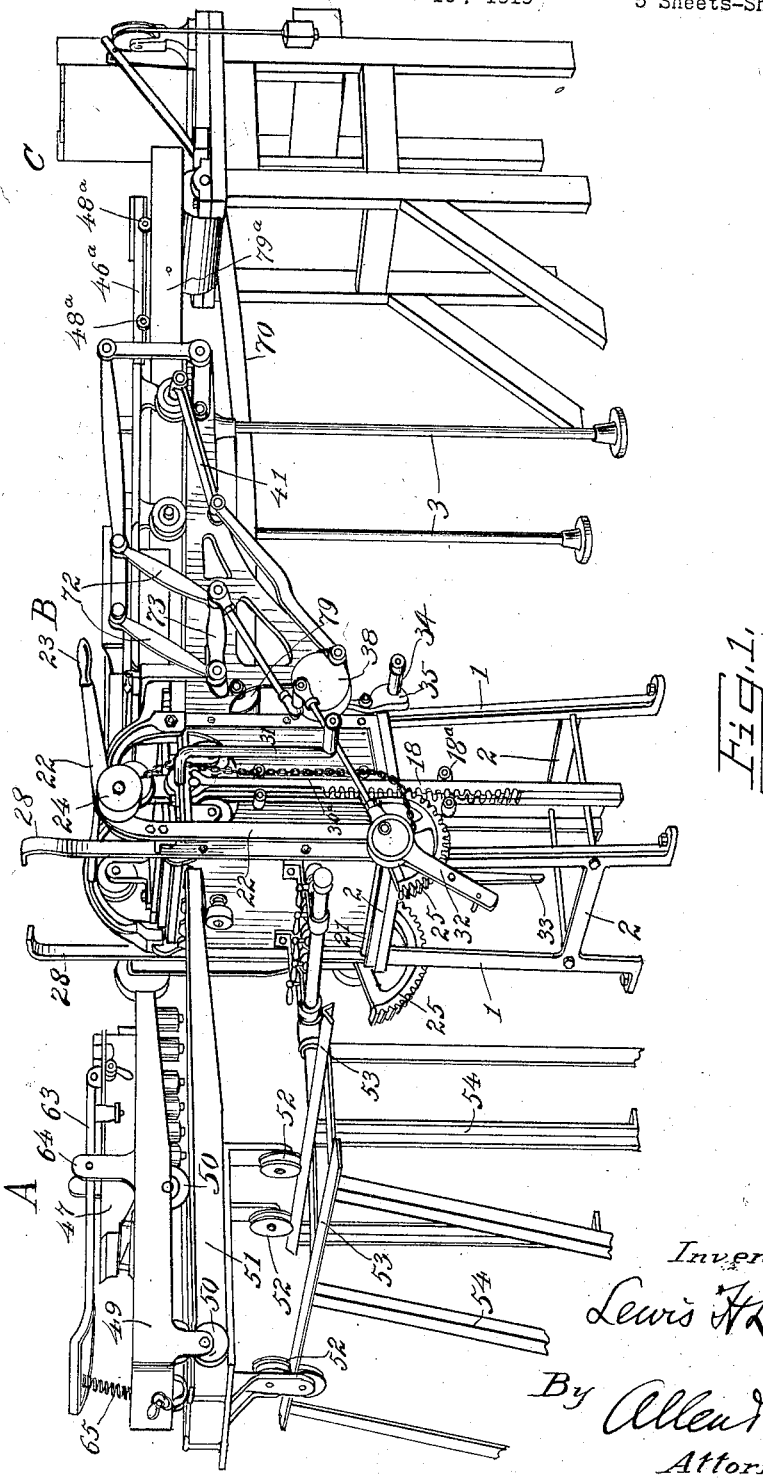

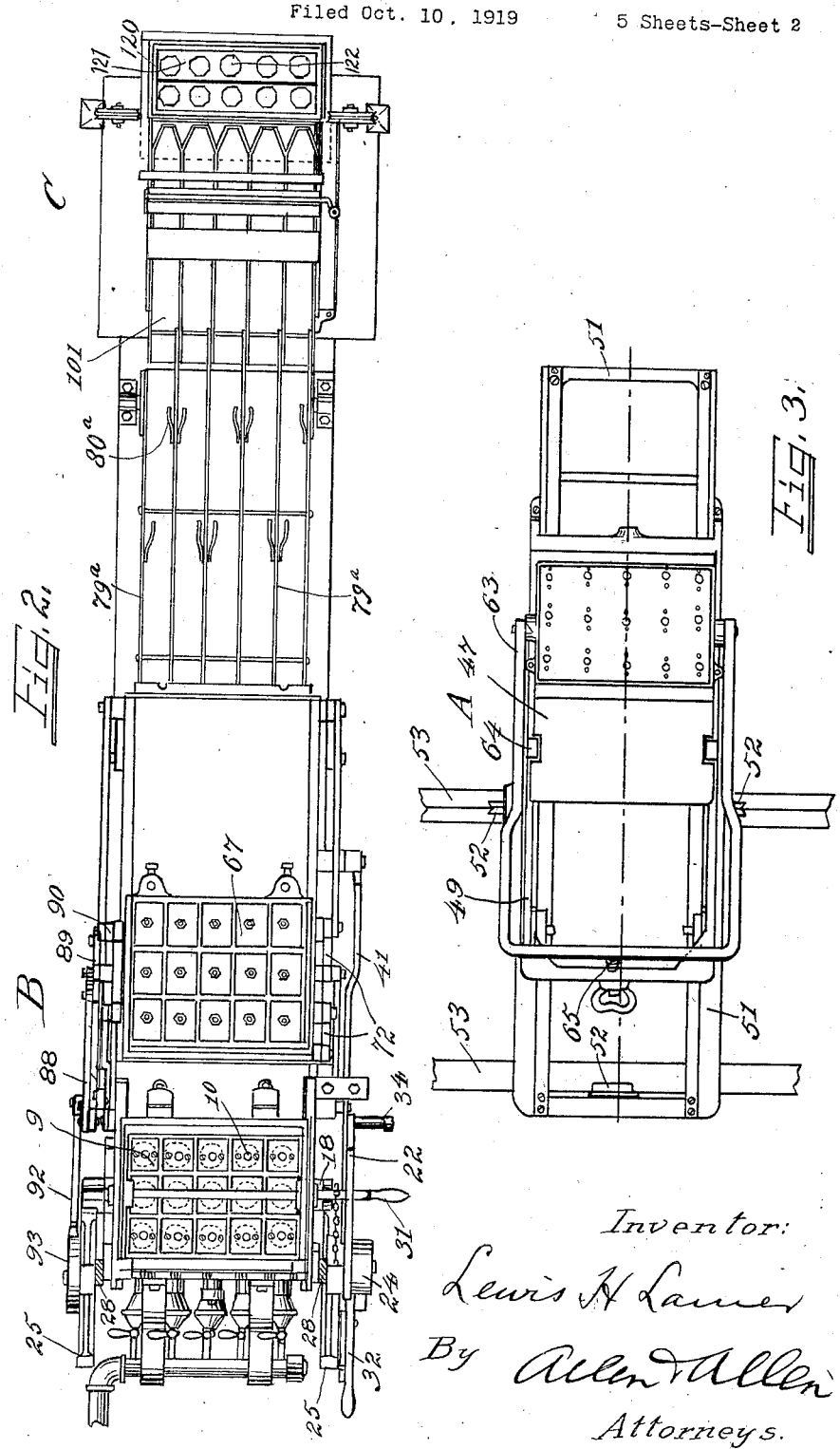

L. H. LANIER 1,505,068

ICE CREAM CONE MACHINE

Filed Oct. 10, 1919     5 Sheets-Sheet 3

Inventor:
Lewis H Lanier
By Allen & Allen
Attorneys.

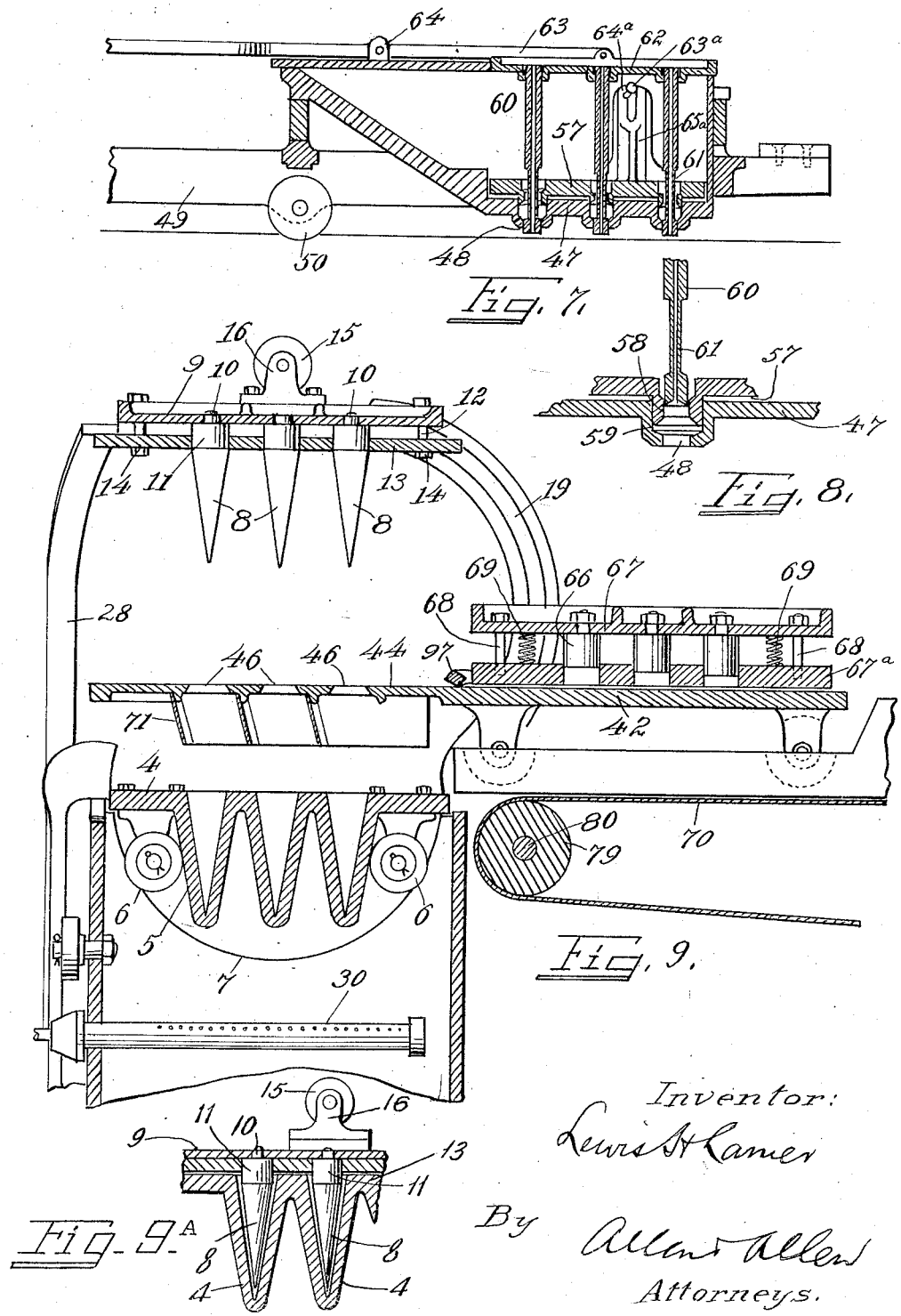

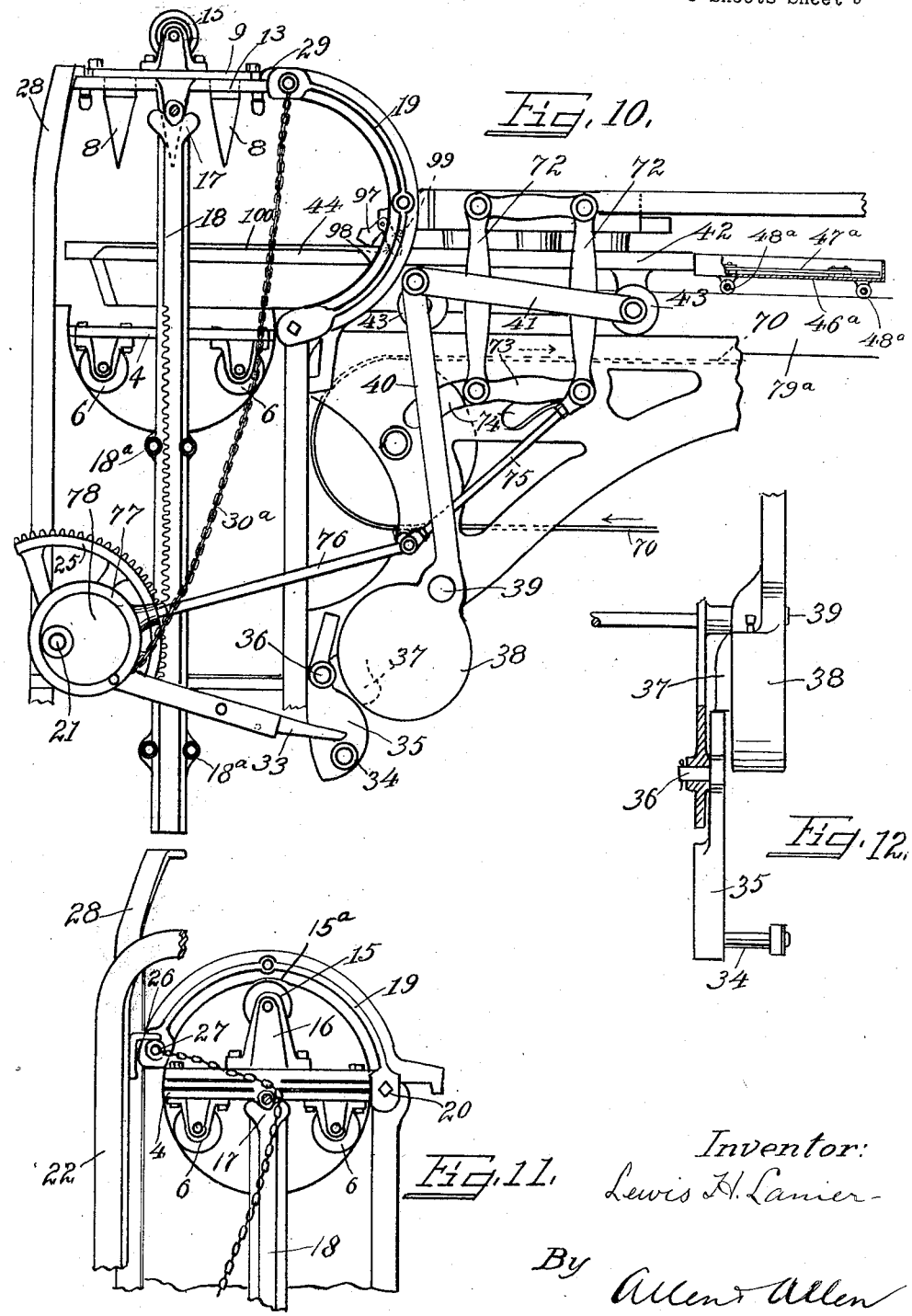

Patented Aug. 12, 1924.

1,505,068

UNITED STATES PATENT OFFICE.

LEWIS H. LANIER, OF NEWPORT, KENTUCKY, ASSIGNOR TO THE FRENCH BROTHERS-BAUER COMPANY, OF CINCINNATI, OHIO, A CORPORATION OF OHIO.

ICE-CREAM-CONE MACHINE.

Application filed October 10, 1919. Serial No. 329,702.

*To all whom it may concern:*

Be it known that I, LEWIS H. LANIER, a citizen of the United States, and a resident of the city of Newport, in the county of Campbell and State of Kentucky, have invented certain new and useful Improvements in Ice-Cream-Cone Machines, of which the following is a full, clear, and exact description, reference being had to the accompanying drawings, forming part of this specification.

My invention relates to the manufacture of hollow pastry shells for the reception of ice cream and the like which have become well known in the trade as ice cream cones by reason of the fact that these shells are usually conical in shape, although, of course, other shapes of molds could be used.

The object of the invention is to provide a machine in which these ice cream cones may be very rapidly formed in a mold and baked, and it consists of that certain novel construction and arrangement of parts to be hereinafter particularly pointed out and claimed.

In machines for molding and baking pastry shells as heretofore constructed, the shells have been formed in molds provided with a core, the batter is then poured into the molds, or in some cases the cores are dipped in the batter before insertion in the molds. The batter is then baked, and the cores withdrawn, leaving the baked shell within the mold. The molds are then opened up, or other means provided by which the baked shells can be removed. Care must be taken in removing the shells from the mold as they are light and frangible, and this necessarily has limited the speed of prior machines, no matter how constructed.

As will appear from the description to follow, my new machine is built on essentially a new principle. Heretofore so far as I am aware, all machines for baking pastry shells have provided for mechanism to withdraw the cores from the molds after the cones are baked and then to remove the baked shells to furnish molds for the next baking. In my novel machine I depart from this plan and provide for the baked shells adhering to the cores, so that the shells are removed from the molds on the cores without any danger of being fractured, and thus with my construction I have found it practicable and easy to remove the shells from the cores, to properly trim and deliver them automatically to a packing machine where they can be packed into cartons also automatically, and with my improved machine as a whole the batter can be deposited in the molds, the shells baked, trimmed and delivered and packed without its being necessary for the operator to touch or handle the finished product.

In the drawings, which illustrate a preferred embodiment of my mechanism, Figure 1 is a perspective view of the entire machine.

Figure 2 is a top plan view.

Figure 3 is a detail top view of the batter pan on its track.

Figure 7 is an enlarged longitudinal section of the batter pan construction.

Figure 8 is a detail section of one of the measuring devices for the batter pan.

Figure 9 is a section of the molds and trimmer for the baked shells.

Figure 4:
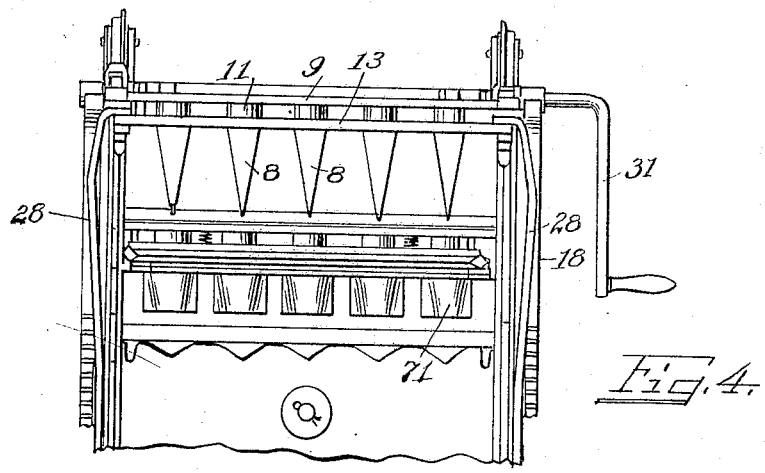
Figure 4 is a section of a portion of the machine showing the trimmer in position to receive the cones when stripped.

Figure 9ª is a detail section of a portion of the molds showing the position of the core in the mold when closed.

Figure 10 is a detail side elevation showing the mechanism for lifting the cores and for operating the trimming device.

Figure 11 is a detail view showing the molds closed.

Figure 12 is a detail view of the tripping mechanism for the trimmer.

Referring to Figure 1, the machine as a whole may be divided into three parts, comprising a batter holder and delivering device indicated at A; what may be called the machine proper B, comprising the baking molds, the trimmer and delivering devices; and the automatic packer C.

The machine proper is mounted in standards 1, 1, provided with cross braces 2, to form a substantial frame work and with rear supporting standards 3, 3. Mounted in fixed relation to the frame but rotatable therein, is the baking pot or pan which comprises the plate 4 (best seen in Figure 9), having a series of molds 5, 5, of any desired number. In the machine illustrated I have shown three rows of five molds each. This baking pan is mounted on rollers 6, 6, at the four corners, which rollers bear within the segment 7, cut in the upper end of side plates of the framework. The cores 8, 8, which cooperate with the molds 5, are of the same number as the mold cavities, and each core is secured to a core plate 9, preferably by stems which project through holes in the plate and secured by screws 10. The cores 8 are provided at their upper ends with a cylindrical portion 11, which cylindrical portion projects with the cores into the mold cavities, so that the pastry shells when formed have a short cylindrical portion at the inner side of the upper end. Hung on studs 12, 12, projecting downwardly from the core plate 9 at each corner, is a stripper plate 13 held from dropping off the core plate by the nuts 14. This stripper plate has cylindrical holes through which the cores project and around which the plate fits somewhat closely, though sufficiently loose to allow free movement.

The core plate is provided with rollers 15 at each end, mounted on upwardly projecting lugs 16, these rollers lying in the same vertical plane with the rollers 6 on the baking pan. The core plate 9 at each end is provided with an outwardly projecting stud which rests in the forked upper end 17 of a corresponding rack bar 18, so that the raising and lowering of the rack bars will raise or lower the core plate and its stripper plate. When the rack bars 18 are lowered by mechanism to be described, the cores 8 will be brought within the mold cavities to complete the mold. In this position, a semi-circular bar or plate 19, one for each side, and pivoted at 20 in the framework, bears upon and engages the roller 15. The rack bars are held and guided vertically on the frame by rollers 18ª.

Mounted in the framework of the machine is a transverse shaft 21, to which is secured on one side the hand lever 22, provided with a handle 23 and suitably weighted with a disk weight 24 (Figure 1). Mounted on this shaft 21 at each end are a pair of segment gears 25, 25, the teeth of which engage the teeth of the rack bars 18, so that by drawing down the hand lever 22 the rack bars are raised, and the raising of the rack bars lifts the core plate and its connections, withdrawing the cores from the molds. The semi-circular bars 19 are locked shut by an angle plate 26 (Figure 11), on the lever 22 which engages over studs 27 projecting from the free end of the semicircular bars 19. The actuation of the lever 22 therefore unlocks the circular bars and allows them to be thrown out of the way as the core plates are lifted, as illustrated in Figure 10, the circular bars being cut away slightly to permit the lever to unlock the bars before the bars are raised, as shown at 15ª in Figure 11.

Inasmuch as the cores 8 are provided with the cylindrical portions 11, the pastry shells or cones that have been baked in the molds as will be hereinafter described, are carried out of the molds and adhere to the cores. As these portions of the cores are cylindrical, there is no draft for the withdrawal of the cores from the baked cone, and it naturally adheres to the cylinder.

As the core plate is raised, the stripper plate 13 near the top of the throw comes into contact with the bent over ends of the stop bars 28, 28 (Figure 4), secured rigidly in the frame while the opposite edge of the stripper plate 13 comes into engagement with the lug 29 (Figure 10) of the semi-circular bars. The stripper plate is thus held while the core plate is raised a slight distance further, which causes the stripper plate to push the baked cones from the cores. The molds are again filled with the batter in the manner to be hereinafter described and the lever handle 22 is lifted, which causes the rack bars carrying the core plate to descend to bring the cores within the molds. In order to obtain a proper and effectual closing of the molds and to prevent the formation of any air bubbles in the batter, it is necessary to compress the batter in the molds, and for that reason I provide the circular support for the molds with the rollers 6 bearing on the circular track 7 and the roller 15 bearing on the circular arms 19. As shown in Figure 11, this circular track is cut away at 15ª so that when the arms are locked, there is no pressure on the mold, but as soon as the mold plate is rotated, as will be described, the cores and molds are pressed close together.

Heat for baking the cones is preferably provided from a gas heater 30, and the trunnion support for the molds is provided with a hand crank 31, by means of which the molds may be inverted. This inversion of the molds thus brings pressure upon the core plate and the mold plate to press them together and the rollers 6 and 15 ride around in the circular path, thus compressing the batter in the mold. When the lever 22 is lifted and the core plate lowered, the circular arms 19 are returned to closed position by the chains 30ª connecting the arms 19 and the segments 25.

The inversion of the molds also brings the other side of the molds in contact with the heat from the gas burner 30.

The pastry having been baked, the core plate lever 31 is turned to bring the molds back into their normal position, and then the hand lever 22 is pulled forward and downward to raise the core plate.

The rock shaft 21 carrying the segment gears which is actuated by the movement of this lever, also carries an arm 32, provided with a pivotally mounted latch 33. As the lever 22 is pulled downwardly, the arm 32 carries the latch 33 into contact with a stud 34 on a weighted locking dog 35 which is pivoted at 36 (Figure 10) on the frame and the outer end of which locking dog engages under a rib 37 on a weight 38 which is pivoted at 39 on the frame, and which is normally held in its elevated position by the dog. The weight carries an arm 40 coupled by a connecting bar 41 with a carriage 42 which is supported by rollers 43, 43, on the top of the frame. Upon the release of the locking dog 35 by the latch 33 the weight moves downward and thus throws the carriage 42 forward to a position where it may receive the cones. The front extension plate 44 from this carrier is provided with a series of openings 46 of a size to receive and hold the cones as they are dislodged from the cores by the stripper plate 13. The movement of the carrier 42 is so timed that the cores will be lifted so as to permit the carrier to pass and the parts are so timed that the openings 46 are brought into alignment with the cores before the cones are dislodged therefrom.

As the batter pan construction for holding the batter has a part to play in returning the carrier to its normal position, I will next describe the construction of this batter holder. The construction is shown in section in Figure 7. The batter pan is a rectangular vessel with a bottom 47 provided with a series of openings 48, to correspond with the number of pastry shell molds. This pan is mounted in a carrier 49 provided with rollers 50 riding on a track frame 51, which track frame is itself carried on rollers 52 which ride on a transverse track 53, supported by a suitable framework or standards 54 in front of the machine. It is intended to provide a series of baking machines and to run the track 53 from one to the other, so that the entire batter pan apparatus may be pushed and transferred from one machine to the next, and so on to fill all the molds in all the machines.

The pan carrier 49 is mounted on the track 51, so that the pan and carrier may be shifted to and from the machine. In other words, with this construction, one batter pan apparatus can be used with a number of machines and the apparatus shoved from machine to machine. To fill the molds with batter, the track carrier is moved up in front of the machine and then the pan carrier is shoved toward the machine to bring the depending outlets from the pan over the mold openings.

In order to deliver to the molds the exact quantity of the batter, I provide as follows: in the bottom of the pan is located a displacement plate 57 (Figure 7) which is provided with depending projections 58 to fit in the recesses 59 at the delivery openings in the pan, as shown in detail in Figure 8. For each of these delivery openings a plunger 60 is provided, which will form a close fit with the opening in the displacement plate. Each of these plungers is cut away or reduced in diameter at 61 and the lower ends of the plungers just fit the delivery openings. The plungers are secured to a plate 62 which is suspended at the end of a lever 63 pivoted in supports 64 on the pan carrier 49. The plungers are normally held in depressed condition by a spring 65. When it is desired to release the proper amount of batter from the pan for each mold, the lever 63 is depressed which raises the plungers into the position shown in Figure 8 and allows the amount of batter that has previously been left in the space above the plunger to pass through the opening 48, and with the descent of the plungers to close the openings 48, the amount of batter will follow behind the plunger and fill in the space 59 so that with the lifting of the plungers only a predetermined amount of batter will pass the delivery opening. To regulate the amount of batter, the displacement plate can be lifted by rocking the rod 63$^a$ which carries hooks 64$^a$ engaging notches in the standards 65$^a$ on the plate. To fill the molds for each machine, the pan carrier mounted on the track is pushed in front of the machine and the pan carrier pushed into the machine to bring the front edge of the pan carrier in contact with the front face of the trimmer plate 44, which will push it back out of position over the molds and allow the batter pan to take its place. The batter pan valves are then opened allowing the measured amount of batter to descend into the molds. When the carriage is pushed back, this movement raises the weight 38 which is locked in its elevated position by the engagement of the locking dog 35 with the projection 37 on the weight.

The pushing back of the extension 44 brings the pastry shells which have been baked and pushed off of the cones by the stripper plate and dropped into the openings 46, in line with the punches 66, which are mounted on a die plate 67 adapted to slide up and down on bolts 68 and normally held in raised position by the coiled springs 69, 69. The dowels 68 take into a stripper plate 67$^a$ and this stripper plate prevents the cones from adhering to the punch 66. When the die plate with the cutters or punches 66 is lowered as hereafter described, the pressure of the springs 69 causes the stripper plate 67$^a$ to press tightly against the flake which connects the cones. This action holds the baked material while the punches perform their work, and the cones are cut cleanly from the flake and the flake is usually left in one piece and usually pushed, therefore, from the plate 42, as will be described. The punches 66 enter the openings 46, cutting and trimming the tops of the cones and dropping them upon the belt 70. In order that the cones shall drop on the belt with their points forward, each of the openings 46 is provided with a shield or guide 71, the action of which is to throw the front of the cone forward. The cutter plate 67 is caused to descend to trim off the cones in proper timed relation with the other movements of the machine by a construction illustrated particularly in Figure 10.

Pivoted to a frame carrying the cutter plate 67 are a pair of levers 72, 72, which at their lower ends are connected together by a tie piece 73. The lower ends of these two levers are guided by studs which project into slots 74 in the framework. One of these levers is connected by connecting rods 75, 76, which are secured together as one piece made in two parts to pass projections with an eccentric 77 mounted on the eccentric disk 78 on the shaft 21. The eccentric is so adjusted that the trimming cutters will not be actuated until the cone carriage has reached the proper position. Then the eccentric will draw on the connecting rods 75 and 76 and bring the trimmers into action. The trimmers are so mounted on the plate 67 that the front set will trim its series of cones before the cutters come in contact with the second set. As a result, the front set of cones will be carried by the belt far enough away to prevent the next set coming in contact therewith on the traveling belt. In order to maintain separation and alignment of the cones as they are carried along by the belt, I provide partitions 79ª and deflecting strips 80ª, as shown in Figure 2.

Figure 5:
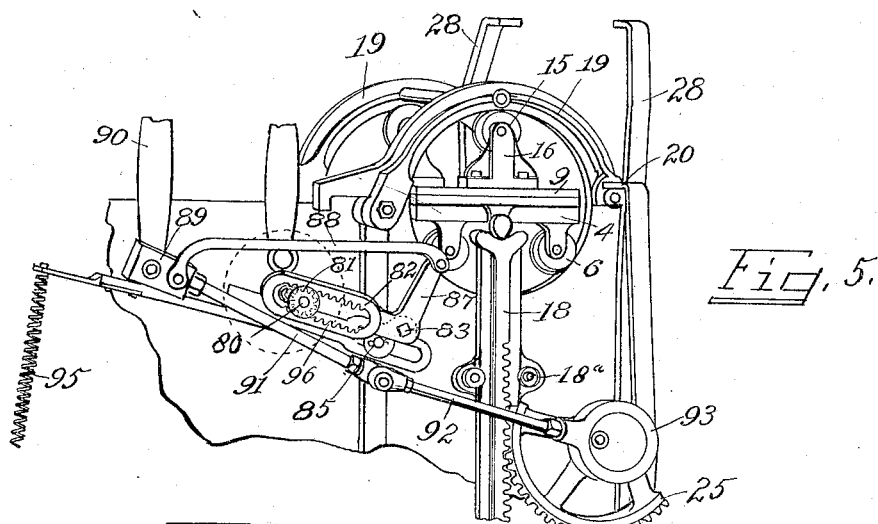
Figure 5 is a detail perspective of the belt driving mechanism, on which belt the finished cones are carried to the packer.
Figure 6:
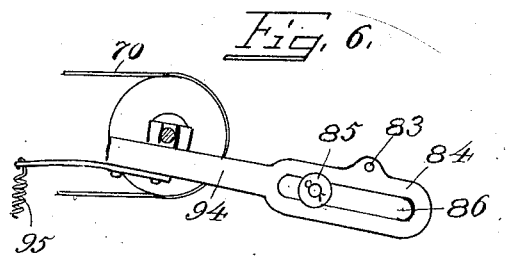
Figure 6 is a detail of this construction.

Mechanism is provided to continuously move the traveling belt in a forward direction. This belt 70 is an endless belt running over the driver roller 79, and a supporting roller at the delivery end of the machine. The endless belt is kept moving continuously in a forward direction by the mechanism illustrated in Figure 5. The spindle 80 of this drive roller is provided with a pinion 81 which engages in a rocker plate 82 pivoted at 83 on a slide piece 84 which is secured to the frame by a stud 85 which engages in a slot 86 in the slide piece. The rocker plate 82 is provided with an upwardly extending arm 87 which is coupled by the connecting rod 88 with the block 89 which forms the bearing for the arm 90 which corresponds to the arm 72 on the opposite side of the cutter plate. This block 89 is connected by the connecting rods 91 and 92 which are rigidly secured together so as to form one rod made in two pieces with the eccentric 93 on the shaft 21, corresponding to the eccentric 77 on the other end of the shaft. The slide piece 84 upon which the rocker plate 82 is pivoted has a forward extension 94 with a spring 95 exerting a downward tension on the forward end and thus tending to lift the opposite end of the slide piece and with it the rocker arm, inasmuch as the slide piece is pivoted on the stud 85. The rocker plate 82 is provided with internal rack teeth 96 on each edge of the slot, and the result of this is that as the eccentric 93 draws on the block 89 through the connecting rods 91, 92, the rocker plate will be rocked to bring first one set of teeth and then the other in mesh with the pinion 81, and as the rocker plate is pivoted on the slide plate 84, the tension of the spring 95 will be to hold the rack that is in engagement with the pinion 81 in mesh, and as the arms 90 of the trimmer are rocked, the pinion 81 will be caused to ride back and forth in the two racks, but always turning in the same direction, so that there will be a continuous rotation of the spindle 80 carrying the drive roller in one direction. Thus whether the trimmer is moving downwardly or upwardly, the traveling belt will be continuously shifted in one direction.

In order to remove from the plate 42 the intermediate flake between the cones which is trimmed therefrom by the trimmer, a scraper 97 is provided pivoted to the front transverse edge of the stripper plate 67ª. This scraper as the plates 42, 44, move to the left, rests upon the plates and holds the flake from being carried with the plate 44 back to the cone delivery position. When the plate 42 is moved to the right, the scraper is arranged to be raised. This is accomplished by a catch 98 which is loosely pivoted on the end of the scraper, and is prevented from moving toward the right by a pin 99 on the stripper plate. Formed on the plate 44 is a side flange 100 and when the plate is moving from left to right as viewed in Figure 10, the catch bears against the stop pin, and the lower end of the catch riding up on flange 100 raises the scraper. On the back throw of the machine, however, the catch 98 merely pivots on the scraper and the scraper thus scrapes the surface of the plates of the accumulated material.

In order to catch the flake, I provide a pan 46ª which is secured to the right hand transverse edge of the plate 42, and this pan is provided with a loose false bottom 47ª hinged along one side, so that as the pan fills up with the material, the false bottom can be lifted and allow the material to drop into a bag or basket. In order to sustain the weight of the pan, it is provided with rollers 48ª, which ride on partitions 79ª.

As we have heretofore described, the cones will be carried on the traveling belt to the delivery end of the machine and delivered to the packer indicated at C in Figure 1. This packing device consists of a series of troughs 101 which receive the cones as they are delivered by the belt and allow the cones to nest one within the other.

While I have illustrated and described a manually operated and controlled machine, it will be understood that the principles of invention lend themselves very readily to a power operated machine in which the hand levers to which I have referred in the course of this description are driven by belts and gearing so as to furnish an entirely automatic machine.

Having thus described my invention, what I claim as new and desire to secure by Letters Patent, is:—

1. The combination with a series of molds and a corresponding series of cores, means for separating the cores from the molds, with the cores provided with a cylindrical portion projecting with the cores into the mold cavities when closed to cause the baked material to adhere to the cores when withdrawn.

2. The combination with a series of molds and a corresponding series of cores, means for separating the cores from the molds, with the cores provided with a cylindrical portion projecting with the cores into the mold cavities when closed to cause the baked material to adhere to the cores, and means to dislodge the pastry material when withdrawn.

3. The combination with a series of molds and a corresponding series of cores, means for separating the cores from the molds, with the cores provided with a cylindrical portion projecting with the cores into the mold cavities when closed to cause the baked material to adhere to the cores, and a stripper plate shiftable on the cylindrical portion of the cores to dislodge the pastry material.

4. A mold plate provided with a series of molds, a core plate provided with a corresponding series of cores, adapted to be moved into and out of the molds, a casing with a circular support for the molds, rollers on the mold and core plates respectively engaging said circular support, and means for rotating the mold and core plates to press the two together, with said circular support adapted to open up to permit the withdrawal of the cores.

5. A mold plate provided with a series of molds, a core plate provided with a corresponding series of cores, adapted to be moved into and out of the molds, a casing with a circular support for the molds, rollers on the mold and core plates respectively engaging said circular support, and means for rotating the mold and core plates to press the two together, with said circular support adapted to open up to permit the withdrawal of the cores, with rack bars engaging said core plate, and gears for operating same to lift the core plate when the material is baked.

6. The combination with a casing and a series of molds and a corresponding series of cores, means for separating the cores from the molds, with the cores provided with a cylindrical portion projecting into the molds when closed to cause the baked material to adhere to the cores, and a stripper plate shiftable on the cylindrical portion of the cores to dislodge the pastry material, with lugs on the casing to engage the stripper plate and hold same during the separation of the cores.

7. The combination with a series of molds and a corresponding series of cores, means for separating the cores from the molds, with the cores provided with means to cause the baked pastry material to adhere to the cores, and means to dislodge the pastry material when withdrawn, trimming mechanism to trim the pastry forms, a plate forming part of the trimming mechanism provided with a series of openings corresponding to the number of cores to catch and hold the pastry forms, and means for shifting the plate to carry the forms to the cooperating part of the trimming mechanism.

8. The combination with a series of molds and a corresponding series of cores, means for separating the cores from the molds, with the cores provided with means to cause the baked pastry material to adhere to the cores, and means to dislodge the pastry material when withdrawn, and a series of punches corresponding to the number of cores adapted to trim the forms in succession, means for holding and carrying the forms to the punches, and an endless belt to receive the pastry material, with means for continually running the belt in one direction to deliver the trimmed forms from the machine.

9. The combination with a series of molds and a corresponding series of cores, means for separating the cores from the molds, with the cores provided with means to cause the baked pastry material to adhere to the cores, and means to dislodge the pastry material when withdrawn, trimming mechanism to trim the pastry forms, a plate forming part of the trimming mechanism provided with a series of openings corresponding to the number of cores to catch and hold the pastry forms, a batter receptacle shiftable into the pathway of the cores to deposit the batter in the molds when separated, and adapted to contact with the carrier plate to shift same to the cooperating part of the trimming mechanism, whereby the baked pastry forms may be removed simultaneously with the deposit of fresh batter in the molds.

10. The combination with a series of molds and a corresponding series of cores, means for separating the cores from the molds, trimming mechanism to trim the pastry forms, a plate forming part of the trimming mechanism provided with a series of openings corresponding to the number of cores to catch and hold the pastry forms, a batter receptacle shiftable into the pathway of the cores to deposit the batter in the molds when separated, and adapted to contact with the carrier plate to shift same to the cooperating part of the trimming mechanism, whereby the baked pastry forms may be removed simultaneously with the deposit of fresh batter in the molds.

11. In combination with a plurality of baking machines with a plurality of sets of pastry molds, of guide rails mounted in front of and transversely of said machines, a carriage to move on said rails, and a batter receptacle mounted on and adapted to move transversely of said carriage into a position over the top of the molds to deliver the batter downwardly to the molds, whereby a single batter receptacle may be used in succession to supply batter to a plurality of sets of molds of a plurality of baking machines.

LEWIS H. LANIER.